Sept. 24, 1968   L. F. S. TISSOT-DUPONT   3,402,747
QUICK COUPLING FOR THE TRANSFER OF FLUIDS
Filed June 2, 1966   5 Sheets-Sheet 1
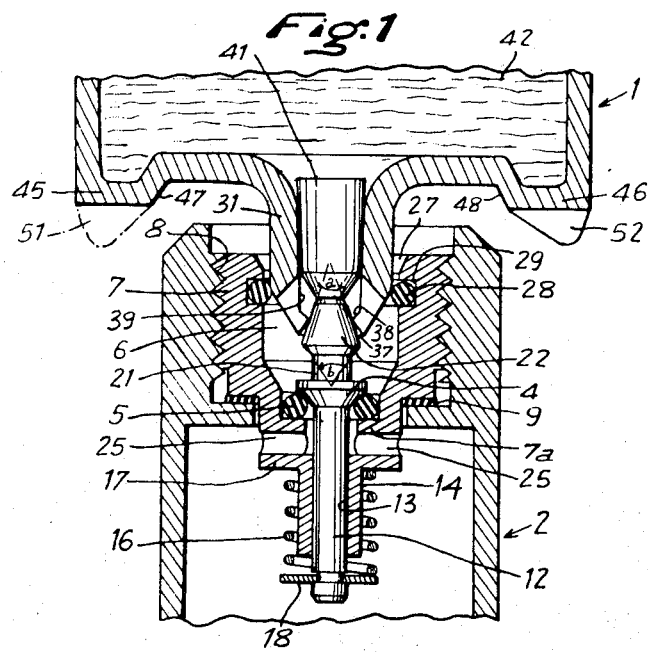
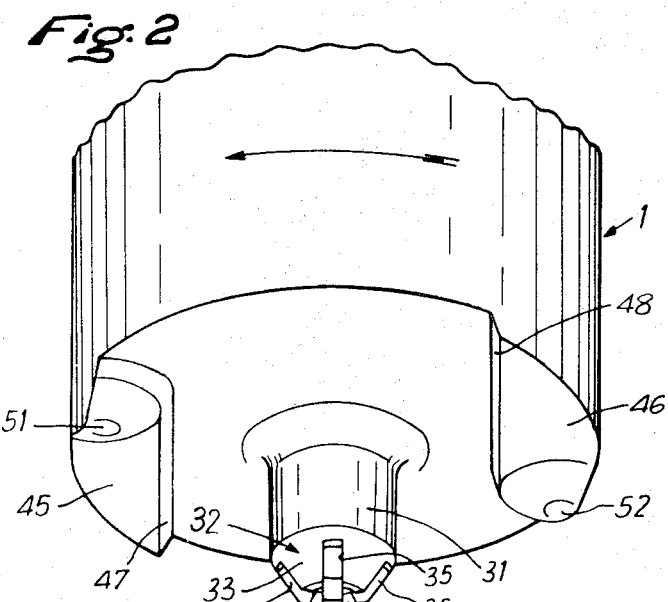

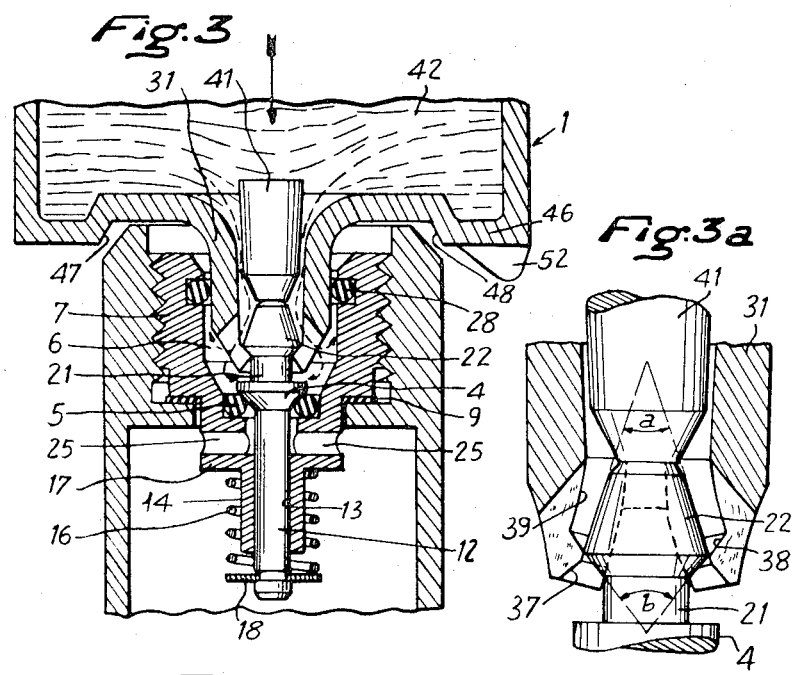
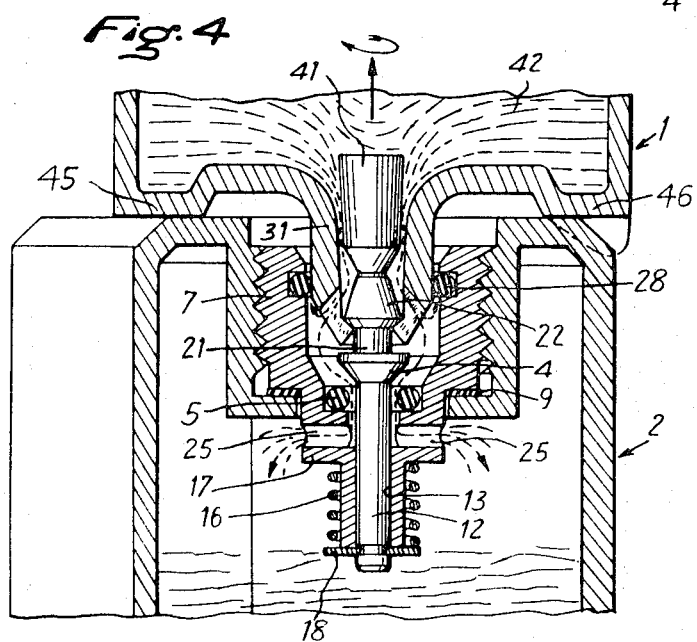

Sept. 24, 1968     L. F. S. TISSOT-DUPONT     3,402,747

QUICK COUPLING FOR THE TRANSFER OF FLUIDS

Filed June 2, 1966     5 Sheets-Sheet 3

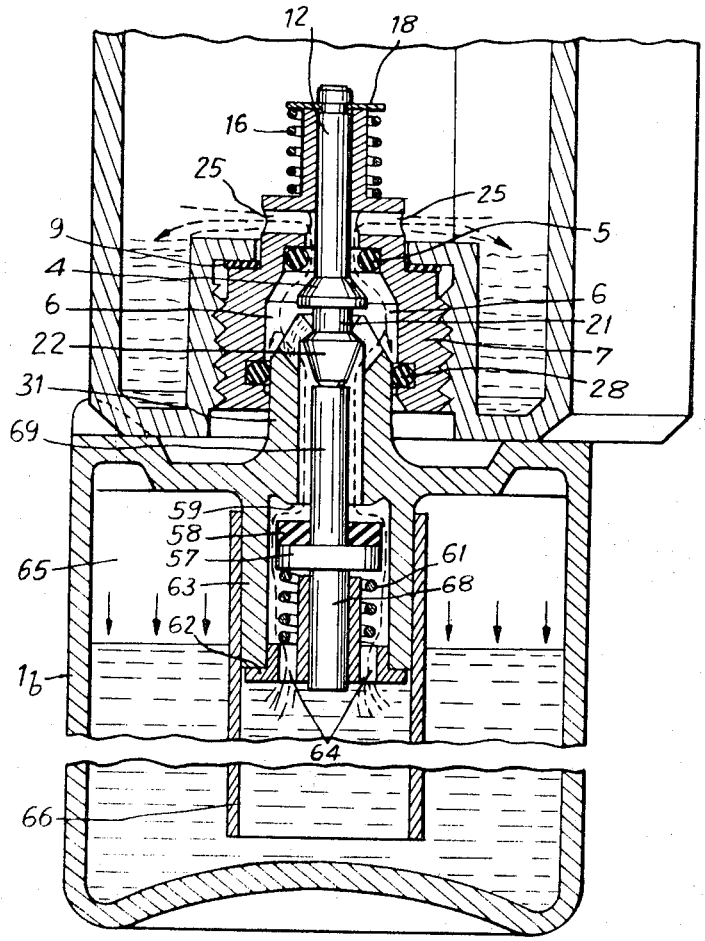

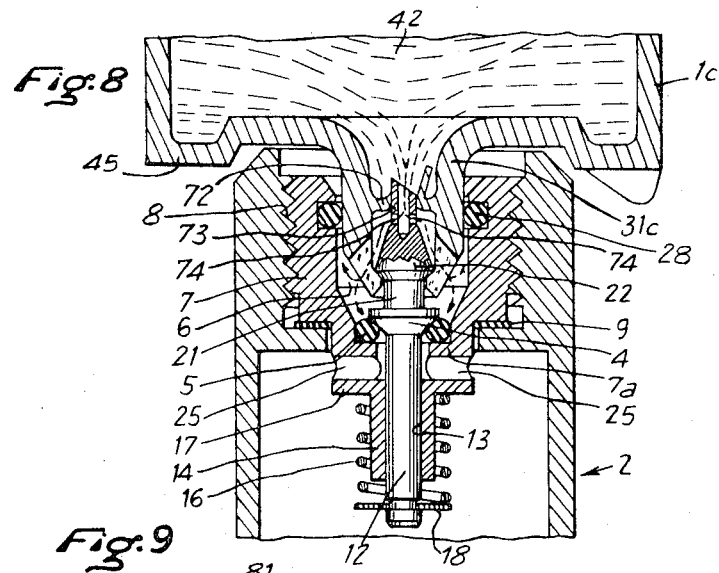
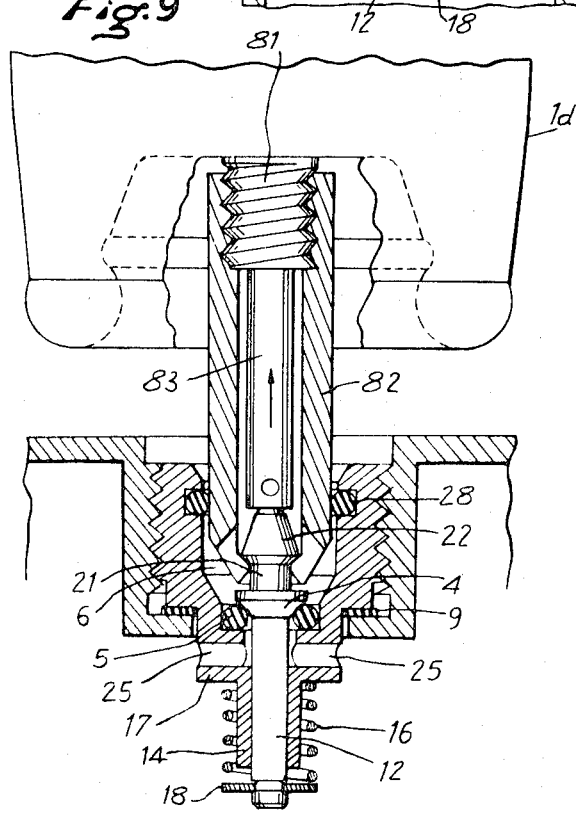
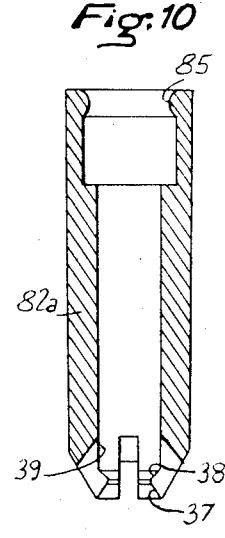

United States Patent Office 3,402,747
Patented Sept. 24, 1968

3,402,747
QUICK COUPLING FOR THE TRANSFER
OF FLUIDS
Lucien François Simon Tissot-Dupont, Paris, France, assignor to Societe S. T. Dupont, Societe Anonyme, Paris, France, a company of France
Filed June 2, 1966, Ser. No. 554,834
Claims priority, application France, June 2, 1965, 19,327
10 Claims. (Cl. 141—348)

This invention relates to an improved fluid-tight coupling assembly established temporarily between two containers for the transfer of fluid and is particularly useful for the transfer of liquified gas from a cartridge into the reservoir of a cigarette lighter.

Briefly stated, the improved coupling assembly comprises an outwardly opening and inwardly spring-biased valve disposed in the reservoir to be filled and having an external enlargement disposed, similarly to the seat of said valve, in an outwardly open cavity in said reservoir and, carried by the cartridge, a nozzle which, during the filling operation, is on the one hand engaged fluid-tight in the opening of the said cavity and, on the other hand, holds open said valve by gripping said enlargement following a snap action engagement between said enlargement and said nozzle. Further, hidden blocking means are provided in the nozzle allowing a fluid flow only after said engagement between said nozzle and said valve is established.

This coupling, in addition to permitting a very convenient transfer of a fluid from one container into another following a simple pushing operation, provides a safety valve for the filled reservoir after the latter is separated from the filler cartridge.

The invention will be better understood and further advantages and novel features will become more apparent from the ensuing specification taken in conjunction with the drawing, wherein:

FIG. 1 is a sectional elevational view of the coupling assembly after the first step towards establishing communication between a cartridge and a reservoir;

FIG. 2 is an isometric view of the lower half of the cartridge shown in FIG. 1;

FIG. 3 is a view similar to FIG. 1 showing the assembly after the second step toward establishing communication between the two vessels;

FIG. 3A is an enlarged view showing an intermediary, maximum deformation of the nozzle during the second step;

FIG. 4 is a view similar to FIG. 3 showing the assembly after the third step with the communication between the two vessels fully established;

FIG. 7 is a sectional elevational view of another embodiment of the coupling assembly using a discharge gas;

FIG. 8 is still another embodiment of the coupling assembly comprising a rupturable seal;

FIG. 9 is a sectional elevational view of the coupling assembly including a refill adapter; and FIG. 10 is another embodiment of the adapter shown in FIG. 9.

Figure 5:
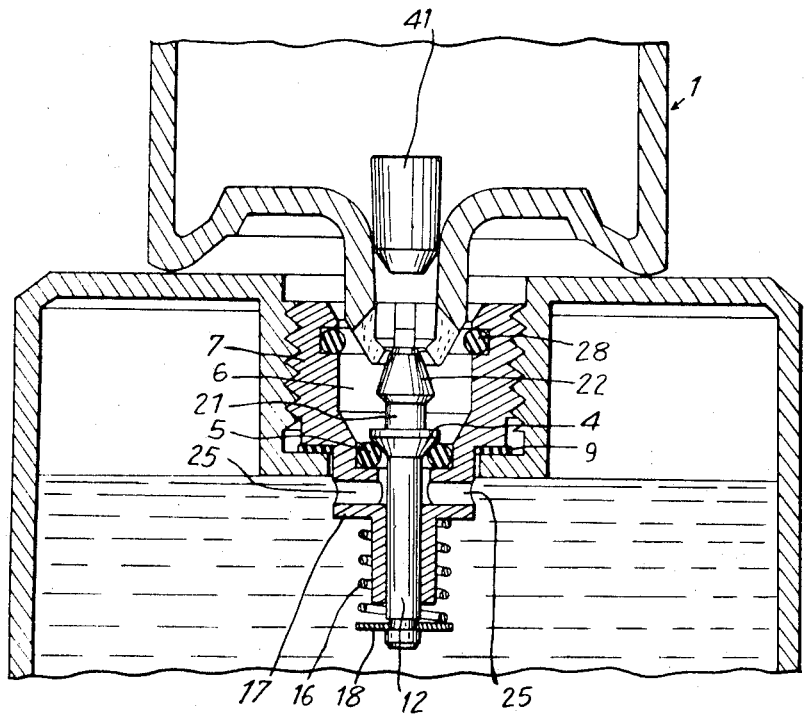
FIG. 5 is a view similar to FIG. 3 showing the coupling assembly after the separating step.

Turning now to FIG. 1, the coupling assembly comprises elements carried by a cartridge 1 which in this embodiment is a refill container containing fuel for gas cigarette lighters and elements carried by the reservoir 2 of said cigarette lighter (not shown).

The elements carried by the reservoir 2 comprise a valve head 4, the seat of which is formed by a sealing ring 5 disposed at the base of a cylindrical cavity 6 formed in a block 7 screwed into a threaded opening 8 in the base of the reservoir 2. A sealing gasket 9 is interposed between the two abutting faces of block 7 and reservoir 2. A valve stem 12 is slidably mounted in a cylindrical opening 13 of the internal extension 14 of block 7. The valve head 4 opens outwardly and is resiliently urged against its seat 5 by means of a coil spring 16, one end of which engages the interior annular face 17 of block 7 and its other end abuts against a washer 18 secured to the extremity of the valve stem 12. The valve head 4 is provided with an axial extension 21 which terminates in an enlargement 22 disposed inside the cavity 6 and having the shape of two opposed cones arranged base-to-base. The apical angle $a$ of the outer cone distal from valve head 4 is smaller than the apical angle $b$ of the opposed inner cone forming part of the enlargement 22.

Immediately below valve head 4 the valve stem 12 extends through an aperture in the base 7a of the block 7. Said aperture and stem 12 form an annular space permitting the passage of the fluid from the cavity 6 into the reservoir 2 through radial conduits 25 when the valve head 4 is unseated. Cavity 6 has an outwardly directed opening 27 adjacent which there is disposed an O-ring 28 nested in an annular recess 29 formed in block 7 and extending radially outwardly from cavity 6.

As shown in this embodiment the reservoir 2 is generally of flat rectangular cross-section; the section shown in FIG. 1 extends parallel to the small sides, whereas the section of FIG. 5 extends parallel to the large sides.

Turning now to the elements carried by cartridge 1, there is shown a cylindrical discharge nozzle 31, the external diameter of which is chosen such that it loosely fits into the cylindrical opening that constitutes cavity 6 and is adapted to frictionally engage the O-ring 28. Nozzle 31 is preferably made of a flexible and elastic material, such as a suitable plastic, and is preferably molded with the cartridge 1 as an integral part thereof. As seen in FIG. 2, the nozzle 31 terminates in a frusto-conical slit jaw 32, the end of which forms an annular lip 34 divided into a plurality of segments by means of radial slots 35. As also seen in enlarged FIG. 3a, the segmented lip 34 is delimited on the outside by the external frusto-conical surface 33, and on the inside by an internal frusto-conical surface 37, an opposed frusto-conical surface 38 and an adjoining cylindrical surface 39. The apical angle of the frusto-conical surface 38 is substantially equal to the apical angle $b$ of the inner frusto-conical part of the enlargement 22 adjacent to the valve head 4. Further, the apical angle of the interior frusto-conical surface 37 of the nozzle 31 is slightly larger than the apical angle $a$ of the outer cone of enlargement 22. The diameter of the internal cylindrical surface 39 of the nozzle 31 is substantially equal to the maximum diameter of the enlargement 22.

Within nozzle 31 there is disposed a plug 41 which is adapted to block the opening thereof. The liquified gas within the cartridge 1 is designated by reference numeral 42.

Turning once again to FIG. 2, the end face of cartridge 1 comprises on either side of nozzle 31 two bosses 45 and 46 which, together with the end face of cartridge 1, define a wide groove, the lateral parallel faces of which are designated by 47 and 48, respectively. The space between the two faces 47 and 48 is slightly larger than the thickness of the reservoir 2 so that the latter may be placed into said groove as will become more apparent as the specification progresses. The two end faces of the bosses 45 and 46 are provided with two frusto-conical protrusions 51 and 52, respectively, that act as cams for separating the reservoir from the cartridge at the end of the filling operation. The importance of this feature also will become more apparent hereinbelow.

Communication between the cartridge 1 and the reservoir 2 is established in four subsequent steps now to be described.

In the first step, the lower end of the reservoir 2 and the cartridge 1 are brought together in an end-to-end relationship by introducing nozzle 31 into opening 27 as shown in FIG. 1. In this position the valve head 4 is still maintained against the seat 5 by means of spring 16. The end of nozzle 31 is in contact with O-ring 28 and the end of enlargement 22 is in contact with the external end of plug 41.

In the second step, manual pressure is applied to the cartridge 1 and the reservoir 2 urging the two together with a force sufficient to force the annular lip 34 of the elastic jaw 32 progressively outwardly as the lip 34 slides onto the outer cone of the enlargement 22. The relative position of the enlargement 22 and lip 34 at the moment of maximum deformation of the latter is depicted in FIG. 3A. After the portion of minimum diameter of the opening of lip 34 clears the portion of maximum diameter of enlargement 22, the lip 34 snaps into the position shown in FIG. 3. In this position the internal frusto-conical face 38 of the annular lip 34 engages the inner frusto-conical face of the enlargement 22 so that lip 34 latches onto said enlargement. At the same time the plug 41 has been pushed towards the inside of cartridge 1 by the end of enlargement 22. Consequently, the liquified gas is permitted to flow out from the cartridge between the cylindrical internal wall of nozzle 31 and plug 41. In this position the external end face of the reservoir 2 is engaged in the groove formed by the two bosses 45 and 46 of the cartridge 1.

In the third step, the pressure of the gases which pass through the radial slots 35 of the nozzle 31 exerts a force to the interior of the cavity 6 and, consequently, urges the nozzle 31 outwardly with respect to block 7. The force of the gas pressure exerted on nozzle 31 is greater than the force of spring 16; consequently, the nozzle 31 moves outwardly pulling valve head 4 open. The opening movement of the valve head 4 is arrested as the washer 18 mounted on stem 12 abuts the end face of extension 14. This position of the coupling assembly is depicted in FIG. 4. The clamping force of the jaw 32 formed by the segmented annular lip 34 of the nozzle 31 should be sufficiently large so as not to yield to the force of spring 16. For an accurate longitudinal positioning of the cartridge and the reservoir, the two are slightly rotated with respect to one another in order to bring the end face of the reservoir 2 into engagement with the end faces of bosses 45 and 46 as shown in FIG. 4. It is to be understood that in the absence of gas pressure, the valve head 4 may be lifted by gently and slightly pulling apart manually the cartridge and the reservoir, then rotating the two until they assume the relative position shown in FIG. 4.

Step four constitutes the filling proper of the reservoir 2 during which the fuel follows the following path from the cartridge: it passes through the annular space between the plug 41 and the nozzle 31, then through the radial slots 35 of the jaw 32, the cavity 6, the annular space between the valve head 4 and its seat 5, the annular space between the valve stem 12 and the opening in the base 7a of block 7, and finally through the radial conduits 25 into the reservoir 2. During this operation a fluid-tight seal of the coupling is maintained by means of the frictional engagement between the O-ring 28 and the outer face of the nozzle 31.

When the filling operation is terminated, a rotary motion is imparted to the cartridge 1 relative to the reservoir 2 as shown by the directional arrow in FIG. 2. Turning now to FIG. 5, as a result of this rotary motion, the conical protrusions 51 and 52 of the cartridge 1 climb up on the end face of the container 2. This camming action causes an axial separating motion of the cartridge 1 and the reservoir 2. During this axial separating motion, the segmented lip 34 of the jaw 32 expands to permit the enlargement 22 to pass therethrough. As soon as the smallest internal diameter of the nozzle 31 clears the maximum diameter of the enlargement 22 (FIG. 3A), the valve head 4 is snapped back against seat 5 by spring 16. By now the filling operation is completely terminated and the cartridge may be lifted off the reservoir.

Figure 6:
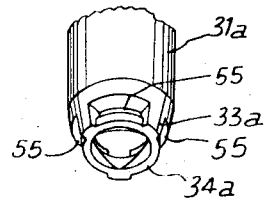
FIG. 6 is an isometric view of a modified cartridge nozzle similar to that shown in FIG. 2.

Turning now to FIG. 6, there is shown a modified discharge nozzle 31a wherein the annular lip 34a of the jaw is continuous, while the frusto-conical part 33a is interrupted by a plurality (for example, three) of cutouts 55. A plastic nozzle of this configuration was found to have a lesser resilient resistance than that of nozzle 31 described before. There is, however, no difference in the steps of the filling operation.

In FIG. 7, there is shown a modified cartridge 1b in which the plug 41 described in connection with the first embodiment is replaced by a valve 57 provided with a seal 58 and urged against seat 59 by a spring 61. One end of spring 61 engages valve 57 while its other end abuts the interior face of a closure 62 which is affixed to a cylindrical, inwardly extending axial portion 63 of cartridge 1b and which is provided with axial perforations 64 to allow the passage of fluid. The fluid is pressurized by means of an inert gas 65, such as nitrogen. To cylindrical portion 63 there is affixed a tube 66 extending axially along cartridge 1b and ending adjacent the bottom thereof. The stem 68 of valve 57 is slidably mounted in a central opening of closure 62. To the other side of valve 57 there is affixed an axial stem 69 having a diameter smaller than the inner diameter of nozzle 31 and extending far enough to be pushed back by enlargement 22 which is introduced into the nozzle 31 as described hereinbefore.

Turning now to FIG. 8, there is shown a modified discharge nozzle for a cartridge 1c. Here, instead of using a plug or a valve, a rupturable membrane 72 is provided which is molded together with the nozzle 31c and is adapted to be pierced by a beveled tubular attachments 73 affixed to the end of enlargement 22. The attachment 73 comprises lateral perforations 74 providing passages for the fuel, allowing it to flow from the inside of attachment 73 communicating with cartridge 1c into the space defined by the enlargement 22 and the opening of the nozzle 31c. Here again, the principle of operation is the same as described before; the flow of liquid is started as soon as the membrane 72 is ruptured by the advancing attachment 73.

In FIG. 9 it is shown how a conventional cartridge or refill container 1d may be modified to be adapted for use with the present coupling. There is provided an adapter 82 which is screwed on the standard threaded opening 81 of a recharge container 1d. The adapter 82, made preferably of plastic, has a free end formed in the same manner as any of the nozzle embodiments described hereinabove. In the inside of adapter 82 there extends a pusher stem 83 which is part either of container 1d or of adapter 82 and which is designed to open the valve of the refill container 1d when pushed by the enlargement 22. Referring now to FIG. 10, instead of using internal threads on the adapter, the same may be affixed to the end of container 1d in any other manner, such as, for example, by means of an annular member 85 disposed at the end of adapter 82a and designed to cooperate with a corresponding shape of the discharge end of the refill receptacle 1d.

It is to be understood that the invention is in no way limited to the embodiments described and illustrated but a number of modifications may be effected without departing from the scope of the invention.

That which is claimed is:

1. A quick coupling assembly for the transfer of fluid comprising:

(A) an elongated nozzle having radially expansible resilient jaw means at one end thereof, (B) means defining a cavity having a base and an opening axially opposed thereto, said base including an aperture, said cavity adapted to receive said nozzle through said opening, (C) valve means including a valve head disposed in said cavity adjacent said base and urged thereagainst into its closed position by a valve spring to block said aperture, extension means axially affixed to said valve head and disposed in said cavity, said extension means terminating in an enlargement adapted to axially penetrate into said nozzle, said jaw means adapted to frictionally hold said enlargement to allow said nozzle to pull said valve head into an open position away from said aperture against the force of said valve spring when said nozzle is moved to a slightly withdrawn position, (D) means disposed within said nozzle to block the passage of fluid therethrough, said last-named means adapted to be removed from its blocking position by said enlargement as said nozzle is introduced into said cavity, (E) sealing means disposed in said cavity and adapted to frictionally engage the outer face of said nozzle as it is introduced into and maintained in said cavity, and (F) means for holding said nozzle in said slightly withdrawn position to maintain fluid communication through said nozzle, said cavity and said aperture.

2. A coupling assembly as defined in claim 1, wherein said jaw is adapted to snap about said enlargement.

3. A coupling assembly as defined in claim 1, wherein said sealing means includes an O-ring nested in an annular recess in said cavity adjacent said opening.

4. A coupling assembly as defined in claim 1, wherein said means for holding said nozzle in said slightly withdrawn position includes cooperating faces one of which is disposed externally of said cavity and movable as a unit therewith, the other of which is disposed externally of said nozzle and movable as a unit therewith, said faces being adapted to be positioned into an opposed abutting relationship.

5. A coupling assembly as defined in claim 4, wherein one of said faces is formed by coplanar outer faces of two opposed parallel bosses defining a groove therebetween, the other of said faces being adapted to lie in said groove when said nozzle is in its deepest penetration in said cavity and being adapted to abut said coplanar outer faces when said nozzle is in said slightly withdrawn position.

6. A coupling assembly as defined in claim 1, including camming means disposed externally of said nozzle and said cavity and adapted to cause a disengagement between said nozzle and said enlargement by forcing said nozzle outwardly beyond its said slightly withdrawn position when said nozzle and said cavity are axially rotated with respect to one another.

7. A coupling assembly as defined in claim 5, wherein each of said coplanar outer faces is provided, at diagonally opposed locations, with a protrusion adapted to force said other of said faces axially away from said outer faces when said nozzle and said cavity are axially rotated with respect to one another causing said nozzle to move outwardly beyond said slightly withdrawn position into disengagement with said enlargement.

8. A coupling assembly as defined in claim 1, wherein said nozzle is directly attached to a fluid container.

9. A coupling assembly as defined in claim 8, wherein said nozzle forms part of said container.

10. A coupling assembly as defined in claim 8, wherein said nozzle is adapted to be temporarily attached to said container.

References Cited

UNITED STATES PATENTS

| | | | |
|---|---|---|---|
| 1,081,149 | 12/1913 | Quick | 141—348 |
| 3,186,449 | 6/1965 | Tissot-Dupont | 141—349 X |

LAVERNE D. GEIGER, *Primary Examiner.*

E. J. EARLS, *Assistant Examiner.*